Oct. 18, 1966  E. C. ROGERS, JR  3,279,312
AUTOMATIC EXPOSURE CONTROL FOR PHOTOGRAPHIC COPIERS
Filed Oct. 6, 1964
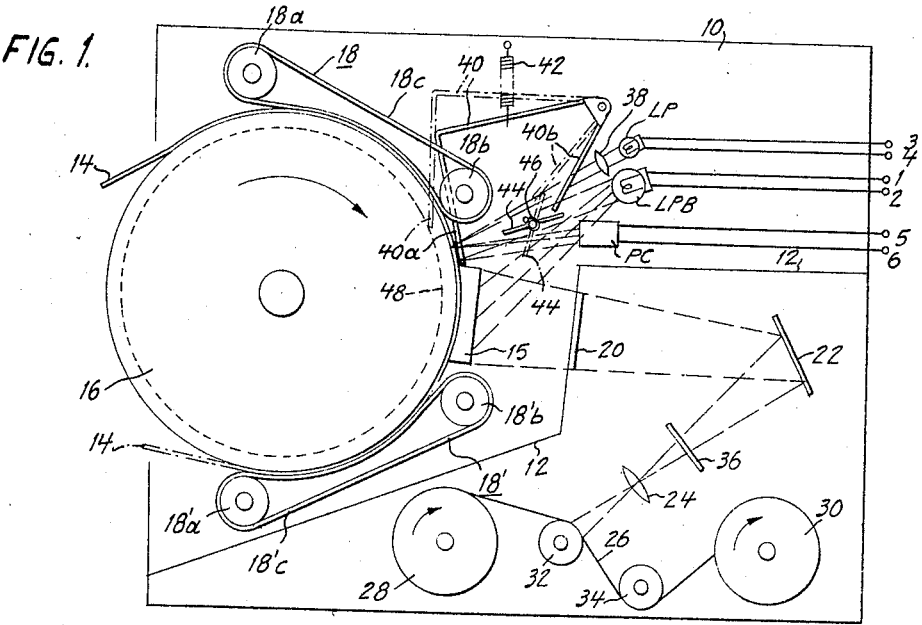
FIG. 1.
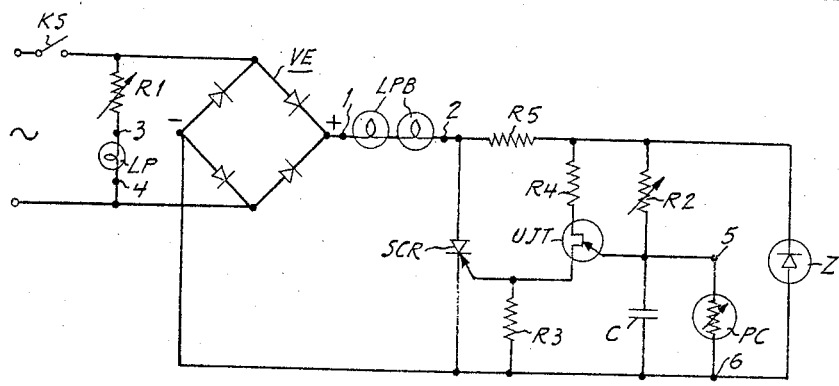
FIG. 2.
FIG. 3.
INVENTOR.
ELWOOD C. ROGERS, Jr.
BY A. J. De Angelis
ATTORNEY United States Patent Office 3,279,312
Patented Oct. 18, 1966

3,279,312
AUTOMATIC EXPOSURE CONTROL FOR PHOTOGRAPHIC COPIERS
Elwood C. Rogers, Jr., Indianapolis, Ind., assignor to Sperry Rand Corporation, New York, N.Y., a corporation of Delaware
Filed Oct. 6, 1964, Ser. No. 401,840
16 Claims. (Cl. 88—24)

The subject invention relates to automatic exposure controls for photographic copiers, and, more particularly, to apparatus for providing automatic and continuous control of the printing light source intensity for microfilm cameras to maintain consistency of negative densities, and is a continuation-in-part of my co-pending application Serial Number 229,378, filed October 9, 1962, now abandoned.

In modern high speed, photographic reproducing apparatus of the "continuous flow" type, such as microfilm cameras, a series of documents to be reproduced onto microfilm are sequentially fed at relatively fast speeds past a "photograph" station; continuously in "rotary" type microfilm cameras, and in step-by-step fashion in "easel" type microfilm cameras. These documents often differ in brightness, one relative to the other, necessitating that frequent correction of the film exposure be made in an effort to maintain consistency of film density for proper reproduction of the documents on film.

To obtain satisfactory microfilm reproductions of the documents, it is, therefore, desirable to control the film exposure automatically and continuously in accordance with the relative brightness or darkness of the surface of each of the documents, as they are fed sequentially to the photograph station. For proper exposure control, it is desirable to measure the relative brightness of each document in advance of such document arriving at the photograph station, and to effect the necessary exposure correction as the document enters the photograph station, while using the same light source (termed printing lights) for measurement and photographic purposes.

Because present day microfilm cameras are usually of small size, it is also desirable to measure the document brightness at a point as closely adjacent to the photograph station as is practical. This, in turn, because of the relatively high speed of document travel in such cameras, necessitates that exposure correction in response to such brightness measurements be effected quickly to minimize undesirable lag between the taking of a brightness measurement and the subsequent correction of the intensity of the printing lights.

Prior art efforts to control film exposure automatically in response to measurements of the document brightness have inherently been subject to an undesirable lag between the taking of the measurement and effecting the exposure correction. Even in relatively slow speed photographic document copiers, efforts to compensate for this undesirable lag, necessitated that the point at which the brightness measurement was taken be located at a relatively remote distance from the point of photographing the document. Such distance increases in proportion to increases in the speed of travel of the document to the photograph station, and for higher speed copiers, results in a bulky and costly mechanism. Above a certain speed of document travel such distance becomes prohibitive.

In modern photographic copiers of limited size, operating at relatively high speeds of document travel, the remoteness required between the measurement and photograph station prohibits use of slow acting exposure controls.

It is, therefore, an object of this invention to provide an improved automatic exposure control for photographic reproducing devices.

A further object is to provide an automatic and continuous control of the printing light intensity for microfilm cameras to obtain consistency of negative densities better than heretofore possible.

Another object is to provide an automatic and continuous exposure control which is fast responsive, and, therefore, especially suited for use in modern high speed photographic reproducing devices.

Yet another object is to provide a fast acting automatic exposure control of simple and compact construction for high speed photographic copiers, which control utilizes the same light source for measuring document brightness and for photographing the document, and wherein such measurement is taken while the document is being fed to the photograph area and is closely adjacent thereto.

The invention involves providing a fast responsive, automatic exposure control which utilizes a photoelectric cell for measuring the relative brightness of each document to be photographed, as such document arrives at a predetermined distance adjacent the photograph area. The photoelectric cell collects printing lights impinging upon the document at such predetermined adjacent distance. The same lighting source is utilized for both measurement and exposure purposes. A quick responsive electronic circuit is connected in series with the camera printing lights and responds to document brightness measurements by the photoelectric cell to modulate the power energizing the printing lights to increase or decrease their intensity, and, in turn, illumination of the document as it arrives in photograph position. The electronic circuitry is sufficiently quick acting to effect exposure control automatically and continuously to maintain consistency of negative densities, notwithstanding variations in the relative brightness of the documents being reproduced sequentially by the camera.

In carrying out the invention, according to a preferred embodiment thereof particularly suitable for the control of printing lights energizable by unidirectional power, a photoconductive cell is utilized to collect and measure light reflected from the document surface as the document arrives a predetermined distance adjacent the photograph position. The camera printing lights are connected in series with an electronic control circuit and their energizing power source. The electronic circuit utilizes a silicone controlled rectifier, the "firing angle" of which is controlled by means of a uni-junction transistor which regulates its gate voltage. Current flow in the base-emitter circuit of the transistor is, in turn, controlled by a resistor-capacitor (R–C) timing circuit. The output of the photocell is connected across the capacitor of the R–C timing circuit. The resistive impedance of the cell decreases in proportion to the amount of light impinging upon it, thereby, varying the R–C timing constant. The R–C time constant, thus determines the "firing angle" of the silicone controlled rectifier, and, therefore, the phase relationship of the current I and the voltage E passing through the silicone controlled rectifier, and, in turn, the energizing power supplied to the printing lights.

In this manner, the subject control automatically and continuously responds to variations in the intensity of light reflected onto the photocell from the documents to be photographed in advance of each document arriving at its photograph position, and is sufficiently fast responsive to effect correction of the printing light intensity for photographing each document as it arrives at the photograph position, notwithstanding the proximity of the measuring station to the photograph station.

Another feature of the subject control is the provision of a second light source and associated lens system for projecting a predetermined relatively small amount of light onto the photoelectric cell. This biases the control to provide a predetermined level of printing light intensity from which level such intensity subsequently may be automatically varied in response to measured variations in document surface brightness.

Still another feature of the subject exposure control automatically causes dimming of the printing lights in the absence of a document to be photographed on the document transport. Such absence, as occurs at the end of a strip of documents, is detected, and a reflecting surface interposed between the printing lights and the document transport surface in position to reflect a relatively large amount of light onto the photocell, thereby causing the subject control to automatically dim the lights. The re-arrival of a document onto the document transport is also detected and initiates removal of the reflecting surface, allowing the printing lights again to impinge upon the document surface for reflection onto the photocell, thereby restoring the automatic exposure control to function in response to the measured relative brightness of the document surface.

In a modified embodiment of the invention particularly suitable for the control of printing lights energizable by alternating power, such as A.C. powered florescent lights, a bilateral switching diode replaces the silicone controlled rectifier of the prior disclosed embodiment. A pulse transformer and a trigger diode of the bilateral avalanche type are electrically interconnected with a resistor-capacitor (R–C) timing circuit to selectively "fire" the bilateral switching diode in either direction of current flow therethrough in accordance with the changing polarity of the applied alternating power. This is accomplished by pulsing the switching diode in excess of its "break over" voltage. This output of the brightness measuring photocell is connected across the capacitor of the R–C timing circuit; the photocell functioning in response to light impinging upon it to vary the R–C timing constant, and, thus, the "firing angle" of the switching diode. This changes the phase relationship of the current I and voltage E passing through the bilateral switching diode in either direction of polarity of the applied power, and, in turn, the energizing power supplied to the printing lights in series therewith to vary the printing light intensity in response to the measurement of the relative brightness of the document to be photographed.

Features and advantages of the invention will be seen from the above, from the following description of the preferred embodiment when considered in conjunction with the drawings, and from the appended claims.

In the drawings:

FIG. 1 is a simplified schematic representation, in section, of a rotary microfilm camera, embodying the invention;

FIG. 2 is a simplified schematic wiring diagram of the electronic circuit for controlling the intensity of printing lights energizable with unidirectional power; and FIG. 3 is a simplified schematic wiring diagram of the electronic circuit for a modified embodiment for controlling the intensity of printing lights energizable with alternating power.

For convenience, the invention will be described as applied to a rotary type microfilm camera in which documents in a continuous strip form, are carried sequentially at relatively high speed past a photograph area and photographed in sequence onto a roll of microfilm carried by a film transport; it being understood nevertheless that without departing from the scope of the invention the subject fast acting automatic and continuous exposure control is applicable to other types of cameras which require automatic and continuous exposure control in response to variations in the brightness of documents to be sequentially photographed.

With reference to FIG. 1, 10 generally designates a rotary microfilm camera casing which is divided by light shield 12 into two equipment compartments. The documents to be photographed are illustrated in the form of a continuous strip 14 fed over a dark rubber surfaced, drive roller 16; the direction of document movement being indicated by a directional arrow.

Means 18, 18' are provided for maintaining document strip 14 in driven frictional engagement with drive roller 16. Each such means, for example 18, consists of an endless belt 18c looped around two rotatably mounted sheaves 18a, 18b. The sheaves are adjustably mounted (not shown), and are positioned to maintain belt 18c under tension, and document strip 14 in driven frictional engagement between drive roller 16 and belt 18c.

Document strip 14 is carried at a certain speed by drive roller 16 past what may be termed the "photograph station" of the camera for continuous sequential photographing of the documents composing the strip. At such photograph station, strip 14 passes beneath a glass 15 which covers and defines the photograph station.

A bank of printing lights, designated LPB, is mounted in position to illuminate the documents for photographing, as they move through the photograph station. As each document of strip 14 moves into position to be photographed, the document image is reflected through glass 15 and camera aperture 20 provided in light shield 12 onto mirror 22. The image is directed by mirror 22 and lens 24 onto film 26. Film 26 is fed at a predetermined speed from reel 28 to reel 30, as is indicated by the directional arrows, passing over tensioning rollers 32, 34.

Printing light bank LPB is arranged to project light rays (shown as broken lines) not only onto the photograph station but also to illuminate a predetermined area in advance and adjacent to the photograph station along the path of document travel. A photoelectric cell PC is positioned so as to collect light reflected from the surface of the documents, as they arrive at a predetermined distance from the photograph station in such illuminated adjacent area. If desired, light pipes (not shown) of a plastic material sold under the trademark, Lucite, may be utilized to carry reflected light from the point of measurement at the document surface, termed the "measurement station," to the light sensitive area of photocell PC.

Since the amount of light reflected by the surface of each document varies with its relative brightness or darkness, the excitation of photoelectric cell PC by the reflected light also varies and is a measurement of the relative brightness or darkness of each document, as it arrives at such measurement station. Such measurement is utilized in the electronic circuit of FIG. 2 to control exposure of film 26 to maintain consistency of negative density, notwithstanding variations in the relative brightness of the documents sequentially photographed thereon.

It may be noted that the same light source, printing light bank LPB, is utilized for measuring the document brightness and for photographing the documents, thus obviating the necessity to compensate for differences in light characteristics, were two separate light sources used therefor.

For proper exposure control, the distance which must be provided between the point of brightness measurement and the photograph station is dependent upon the speed of document travel and the speed with which exposure correction is effected. In one tested embodiment of the control, illustrated in the circuit of FIG. 2, with a rotary microfilm camera, operating at a speed of document travel of 150 feet per minute, satisfactory exposure control was obtained with photocell PC excited by light collected from the document surface at a point approximately ½ inch from the photograph station.

In FIG. 2, printing light bank LPB, illustrated as two lights, is connected at terminals 1 and 2 in series with a fast responsive, electronic, power modulating network, which controls their intensity. Control of the intensity of light bank LPB, in turn, controls the amount of illumination provided for photographing the documents to control exposure of film 26 (FIG. 1) and maintain consistency of negative density.

Pulsating unidirectional power is applied to printing light LPB (FIG. 2) and the power modulating network through full wave rectifier VE and manual switch KS (when closed) from any suitable alternating power source (not shown). The power modulating network comprises a silicone controlled rectifier SCR of the TI-40A2 type; a unijunction transistor UJT of the 2N1671A type, a resistor capacitor timing circuit (R5, R2, C) resistor R2 being adjustable, and a zener diode Z of the IN1527 type, all electrically interconnected in the manner shown. Photoelectric cell PC is connected at terminals 5 and 6 across capacitor C of the R-C timing circuit, and is of the photoconductive type which characteristically decreases its resistive impedance in proportion to the amount of light impinging upon it. Proper color filtration, by means of filters, generally designated 36 (FIG. 1), is provided to correlate the color response of photosensitive element PC, film 26 and printing lights LPB.

Wtih manual switch KS actuated to closed position, power is applied to the circuity of FIG. 2. Transistor UJT controls the "firing angle" of rectifier SCR by regulating the gate voltage across resistor R3. Current flow in the base-emitter circuit of transistor UJT is, in turn, controlled by the R-C timing circuit (R5, R2, C). Capacitor C charges through resistors R5 and adjustable resistor R2 and discharges through resistor R3. The R-C time constant, thus, determines the phase relationship of the current I and voltage E passing through silicone rectifier SCR.

For example, a relatively high R-C time constant, causes the current I to lag the voltage E, thereby causing the power output of SCR to be relatively low. Since printing lights LPB are in series with the power modulating network, they, therefore, receive reduced power, and provide illumination of reduced intensity. The R-C time constant is adjusted by means of variable resistor R2 to obtain a proper amount of light intensity for subjects of average brightness. Zener diode Z acts as a voltage regulator on the R-C timing circuit and transistor UJT to minimize the effects of variations in line voltage.

To illustrate the control operation, assume that photocell PC has been properly positioned in relation to the photograph station for a certain speed of document travel, the camera is loaded with film, in operation, and document strip 14 is being driven by drive roller 16 past the photograph station at such certain speed. Such "in operation" condition of the camera is shown in FIG. 1. Further assume that by presetting adjustable resistor R2 (FIG. 2) printing lights LPB are presently energized by the exposure control, as has been explained previously, an amount predetermined to illuminate properly documents of average brightness.

In such a case, lights LPB project light upon the document surface presently in photograph position, and upon the document surface presently at the measuring station adjacent and in advance of the photograph station for measuring the document brightness, as the document to be next photographed moves through such measuring station.

Next assume that the document surface presently moving past the measuring station is of increased relative brightness, causing a consequent increase in the intensity of light reflected therefrom onto photocell PC. Such increase causes a corresponding decrease in the resistive impedance of photocell PC in parallel with capacitor C. This impedance decrease, in turn, decreases the effectiveness of capacitor C in the aforementioned R-C timing circuit, causing a corresponding increase in the R-C time constant and a consequent lag in the flow of current I with respect to voltage E through silicone controlled rectifier SCR. Such current lag reduces the power supplied to printing lights LPB, decreasing their intensity, as such measured document arrives at the photograph station, thereby automatically correcting the document illumination for the relative increase in brightness of the document to be photographed. The portion of film 26 onto which such measured document is photographed is, thus, exposed in accordance with the measured relative brightness of such document.

Next assume that the opposite occurs, i.e., light impinging upon photocell PC from the document surface presently moving past the measuring station and to be photographed decreases due to a decrease in the relative brightness of the surface of such document. Under such circumstances, the resistive impedance of photocell PC correspondingly increases, thereby increasing the effectiveness of capacitor C, and, in turn, decreasing the R-C time constant. Such decrease of the time constant causes current I to move more into phase with voltage E in the circuit of silicone controlled rectifier SCR, thereby increasing the power output of SCR, and, in turn, the intensity of printing lights LPB. This automatically increases the illumination of the document surface to be photographed, as it arrives at the photograph station and is photographed thereat, thereby correcting the film exposure for the relative darkness of such document.

The subject control automatically and continuously responds to variations of the intensity of light reflected from the surface of each document to be photographed onto photocell PC in advance of such document arriving at its "photograph position," and is sufficiently fast responsive to effect a correction of the printing light intensity for photographing the document, as such document arrives at "photograph position," notwithstanding the proximity of the measuring station to the photograph station. In this manner, proper exposure of film 26 is maintained continually and automatically, i.e., more light for photographing is provided for relatively dark subjects and less for relatively light subjects in response to their measured relative brightness, thereby automatically correcting for variations in the relative darkness of the documents being photographed sequentially and maintaining consistency of negative density. With the subject control quality document reproduction is obtained in high speed, compact photographic copiers of the "continuous flow" type.

Provision is also made for preadjusting the linearity of the exposure control in accordance with the light response characteristics of the particular film used, although satisfactory operation is obtained in certain instances without such preadjustment. The preadjustment is accomplished by presetting the light intensity of printing lights LPB by means of second light source LP (FIG. 1).

Second light source LP may be energized from any suitable source. For simplicity, in the embodiment illustrated in FIG. 2, it is shown connected at terminals 3, 4 through an adjustable resistor R1 across the input supply lines. Light from second light source LP is focused through lens system 38 (FIG. 1) onto a portion of document strip 14 at the measurement station in the area of photocell light collection. The intensity of second light source LP is adjusted by presetting adjustable resistor R1 to provide a predetermined excitation of photocell PC in accordance with the characteristics of the film used. Such predetermined excitation biases the exposure control to provide a predetermined amount of illumination at the photograph station for photographing documents of average relative brightness onto the particular film being used. The intensity of second light source LP remains constant and is not varied by the control in response to measured document brightness. However, the amount of its light which is reflected onto photocell PC varies in response to the relative brightness of the documents to be photographed, and in so doing, tends to provide linearity of control in accordance with the characteristics of the film being used.

Mechanism is also provided for causing the exposure control to automatically dim printing lights LPB, when the photographing of document strip 14 is completed. Such mechanism is illustrated schematically in FIG. 1 and includes a shutter trigger bar 40 pivotally mounted and spring biased clockwise by spring 42. Shutter trigger bar 40 has a depending document strip engaging portion 40a for sensing the presence of document strip 14 on drive roller 16, and another depending portion 40b, engaging a pivotally mounted reflecting disc 44. Reflecting disc 44 is spring biased counterclockwise by an associated spring 46. Both shutter trigger bar 40 and reflecting disc 44 are shown in solid outline for the condition where a document strip 14 is present on drive roller 16 and engages sensing portion 40a of trigger bar 40, thereby maintaining trigger bar 40 and disc 44 in their respective solid outline positions.

In such condition, depending portion 40b of shutter trigger bar 40 engages and maintains reflecting disc 44 rotated clockwise against its spring bias into a position placing the disc reflecting surface substantially parallel with the rays of light emitted by light sources LPB and LP, thereby permitting transmission of such rays to the document surface for measurement and photographic purposes.

Assume that the trailing edge of document strip 14, presently being photographed, "runs off" of drive roller 16, exposing the dark rubber surface of drive roller 16. This results in minimal light being reflected from such dark surface onto photocell PC, and, if not corrected for, causes, as has been explained previously, the subject control to increase intensity of printing lights LPB to near maximum, thereby appreciably shortening the useful life of such lights.

However, as the document strip trailing edge is driven past sensing portion 40a of shutter trigger bar 40 and loses engagement therewith, trigger bar 40 is rotated by its spring 42 clockwise into the position shown in broken line outline, causing its depending document strip, sensing portion 40a to move into a peripheral groove 48 defined in drive roller 16. Such clockwise movement of shutter trigger bar 40 also causes its depending portion 40b to move out of engagement with reflecting disc 44, permitting disc 44 to rotate counterclockwise, under the influence of its biasing spring 46, into the position shown in broken line outline, wherein the disc reflecting surface is in the path of the light rays from light sources LPB and LP. In such position, reflecting disc 44 reflects a substantial amount of light onto the photo-sensitive area of photocell PC, increasing the excitation of the photocell. Such increased excitation of photocell PC, as has been previously described, causes the exposure control to reduce substantially the excitation of printing lights LPB, causing them to dim, thereby increasing their useful life.

Disc 44, when rotated into light reflecting position in response to the sensing of the passage of the last document to be photographed past the measuring station, thus, prevents the black rubber surface of drive roller 16 from causing a reduction in the excitation of photocell PC and the consequent undesirable increase of printing light intensity by the exposure control.

Next assume that a second document strip 14 to be next photographed is fed onto drive roller 16. As the leading edge of the document strip approaches the measuring station, it engages depending portion 40a of trigger bar 40, actuating trigger bar 40 counterclockwise against its spring bias from its broken outline position to its solid position. As trigger bar 40 is rotated counterclockwise, its depending portion 40b engages reflecting disc 44, actuating the disc clockwise against its spring bias out of reflecting position and into non-reflecting position (shown in solid outline). In such non-reflecting position, disc 44 ceases to reflect light onto photocell PC and allows light from light sources LP and LPB again to be reflected from the document surface at the measuring station onto photocell PC for measuring the document brightness.

In the modified embodiment of the electronic control, illustrated in the circuit of FIG. 3, circuit elements similar to those of the circuit of FIG. 2 bear the same designations (for example, photocell PC and lamp LPB) and are similarly mounted in the photographic copier of FIG. 1.

Alternating power from any suitable force (not shown) is applied to printing lights LPB (FIG. 3) and the power modulating circuit connected in series therewith through manual switch KS (when closed). The power modulating circuit comprises a bilateral switching diode TBS of the Transitron TBS–20AS type; a step-up transformer TR having a primary winding TRP and a secondary winding TRS wound in the ratio of approximately 1 to 30; resistor-capacitor timing circuit (R1, R2, C2, C3), resistor R2 being adjustable; a bilateral avalanche diode TI of the Transitron TI43 type, and a capacitor C1, all electrically interconnected in the manner shown. Photoelectric cell PC is connected at terminals 5 and 6 across capacitor C3 of the R–C timing circuit, and is of the photoconductive type which characteristically decreases its resistive impedance in proportion to the amount of light impinging upon it.

Assume that manual switch KS is actuated to closed position, applying power to the circuitry of FIG. 3. Capacitor C1 is selected of such value as to allow printing lights LPB to energize and illuminate the documents for photographing. As has been previously described with relation to the operation of the circuitry of FIG. 2, a certain amount of such light is reflected from the document surface onto photocell PC in accordance with the relative darkness or brightness of such document surface. In the timing circuit, capacitor C2 starts to charge through resistor R1. Capacitor C3, in turn, starts to charge through resistors R1 and adjustable resistor R2. A predetermined amount of current flows through photocell PC in proportion to the amount of light impinging upon it.

When on the positive half cycle of the applied alternating power capacitor C3 has charged to the "breakdown" voltage of the bilateral avalanche diode TI, such diode conducts in a first direction therethrough. Upon such conduction, capacitor C3 discharges through diode TI and the primary winding TRP of transformer TR. Such discharge causes the generation of a pulse of a relatively high voltage magnitude in the secondary winding TRS of transformer TR. Such pulse is applied across bilateral switching diode TBS, and is of sufficient magnitude to exceed the "breakover" voltage of such switching diode in a first direction of current flow therethrough, causing such diode to "fire" and conduct. Diode TBS remains in conducting condition until reversal of the polarity of applied power across it.

Similar action is obtained during application of the half wave of negative polarity of the applied alternating power with the distinction that switching diode TBS is caused to conduct in the opposite direction. This occurs since avalanche diode TI conducts in the opposite direction, pulsing primary winding TRP of transformer TR and generating a relatively high voltage output pulse in the secondary winding TRS of the transformer, which output pulse is of a polarity to "fire" bilateral switching diode TBS in the opposite direction of current conduction therethrough.

The R–C time constant of the circuit determines the "firing angle" of the bilateral switching diode TBS for the half waves of applied power of both positive and negative polarities, thereby, determining the phase relationship of the current I and voltage E passing through such switching diode, and, in turn, printing lights LPB. An increase in light impinging upon photocell PC decreases the power applied to printing lights LPB and vice versa to control the intensity of the printing lights in response to the measured relative darkness or brightness of the document to be photographed, as has been previously described for the circuitry of FIG. 2.

It may be noted that the subject control, although disclosed as applied to a rotary type microfilm camera, is applicable generally to photographic copiers of the "flow type," in which copiers the subjects to be reproduced are fed continuously and automatically in sequence to a reproduction station.

As changes can be made in the above described construction and many apparently different embodiments of this invention can be made without departing from the scope thereof, it is intended that all matter contained in the accompanying drawing be interpreted as illustrative only and not in a limiting sense.

What is claimed is:

1. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a predetermined portion of said path extending throughout said photograph station and a certain area adjacent and in advance thereof along said path, a photoelectric cell adapted to collect light energy impinging upon the document to be next photographed, under conditions where said such next document is adjacent said photograph station and within said certain area, an electrical power source for energizing said light source, and an electronic fast responsive network for varying the energization of said light source by said power source, said electronic fast responsive network including electronic switching means connected in series with said light source and said power source and means for controlling said switching means, said cell operatively connected to said controlling means for automatically controlling the switching means in response to variations in intensity of said collected light to cause said network to vary said energization inversely to said light intensity variations.

2. In a continuous flow photographic reproducing device in which there are provided a document transport for feeding documents in certain timed sequence along a predetermined path to a photograph station for photographic reproduction thereat, a corresponding film transport for continuously feeding photographic film in timed relation to said document feed to an exposure position for photographically copying said documents sequentially, a light source adapted when energized to provide illumination of said documents as they arrive adjacent to and at said photograph station, and means causing the image of the document at such photograph station to be projected onto said film at said exposure position for photographic reproduction of said document image thereon, a film exposure control comprising, a photoelectric cell adapted to collect light energy impinging upon a document to be photographed under conditions where such document is at a predetermined distance adjacent and in advance of said photograph station in said predetermined path, said cell being electrically responsive to variations in the intensity of such collected light energy, an electrical power source for energizing said light source, and an electronic fast responsive network, said electronic fast responsive network including electronic switching means connected in series with said light source and said power source and means for controlling said switching means, said cell operatively connected to said controlling means for automatically controlling the switching means in response to said cell response for varying the energization of said light source by said power source inversely with respect to said variations of said collected light.

3. In a continuous flow type microfilm camera in which a document transport sequentially feeds a plurality of documents at a certain speed of document travel along a predetermined path extending through a photograph station for photographic reproduction thereat onto an associated reel of film; and a light source is adapted, when energized, to provide illumination of said documents for photographing, said light source projecting light upon a certain portion of said path, said certain portion extending throughout said photograph station and a certain area in advance and adjacent thereto along said path; a film exposure control comprising; a photoelectric cell adapted to measure sequentially the brightness of each document relative to a certain brightness as said documents arrive sequentially within said certain illuminated adjacent area; an electrical power source energizing said light source; and an electronic power modulating network, said electronic power modulating network including electronic switching means connected in series with said light source and said power source and means for controlling said switching means, said cell operatively connected to said controlling means for automatically controlling the switching means in response to said sequential brightness measurements to vary the energization of said light source by said power source to illuminate each document an amount corresponding to the measured brightness of such document as such document arrives at said photograph station.

4. An exposure control as set forth in claim 3 wherein means are provided for projecting focused light of a certain constant intensity upon said certain area to bias said brightness measurements of said photoelectric cell.

5. An exposure control for a continuous flow type microfilm camera in which camera each document to be next photographed is moved at a certain speed along a predetermined path through a photograph station for photographic reproduction thereat onto film and is illuminated at such station for photographing by a light source, said control being characterized in that said light source projects light upon a certain portion of said path extending through said photograph station and a certain area in advance and adjacent thereto along said path, and in which control are provided a photoelectric cell measuring the brightness of said next document relative to a certain brightness as said next document arrives within said certain adjacent area, and electrical energizing means for said light source, said energizing means being responsive to said cell measurement to energize, as such next document arrives at said photograph station for photographing, said light source for an illumination intensity predetermined in accordance with the measured brightness of such next document, said photoelectric cell being of the photoconductive type and excited by light reflected from the surface of the said document in said certain adjacent area, said electrical energizing means including a silicone controlled rectifier and associated triggering means for controlling the phase relationship of the current I and voltage E passing through said rectifier and energizing said light source, said triggering means being controlled by a resistor-capacitor timing circuit the timing constant of which is varied by said excitation of said photoelectric cell.

6. An exposure control for a continuous flow type microfilm camera in which camera each document to be next photographed is moved at a certain speed along a predetermined path through a photograph station for photographic reproduction thereat onto film and is illuminated at such station for photographing by a light source, said control are provided a photoelectric cell measuring the jects light upon a certain portion of said path extending through said photograph station and a certain area in advance and adjacent thereto along said path, and in which control are provided a photoelectric cell measuring the brightness of said next document relative to a certain brightness as said next document arrives within said certain adjacent area, and electrical energizing means for said light source, said energizing means being responsive to said cell measurement to energize, as such next document arrives at said photograph station for photographing, said light source for an illumination intensity predetermined in accordance with the measured brightness of such next document, said photoelectric cell being of the photoconductive type and excited by light reflected from the surface of said document in said certain adjacent area, said electrical energizing means including a bilateral switching diode and associated triggering means for controlling the firing angle of said bilateral switching diode for both directions of current flow through such switching diode, said triggering means including a bilateral avalanche triggering diode, the bilateral break down of said triggering diode being controlled by a resistor-capacitor timing circuit, the timing constant of which is varied by said excitation of said photoelectric cell.

7. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a predetermined portion of said path extending throughout said photograph station and a certain area adjacent and in advance thereof along said path, a photoelectric cell adapted to collect light energy impinging upon the document to be next photographed, under conditions where said such next document is adjacent said photograph station and within said certain area, an electrical power source for energizing said light source, and an electronic fast responsive network for varying the energization of said light source by said power source, said cell responding to variations in intensity of said collected light to cause said network to vary said energization inversely to said light intensity variations, said electronic fast responsive network being electrically connected in series with said light source and said power source, said electronic network including a silicone controlled rectifier, a junction transistor adapted to control the firing angle of said silicone controlled rectifier, and a resistor-capacitor timing network adapted to control the current conduction of said junction transistor, said photoelectric cell being of the photoconductive type and connected in shunting relationship to the capacitor of said resistor-capacitor network to vary the timing constant thereof in accordance with the intensity of light collected by said photoelectric cell.

8. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a predetermined portion of said path extending throughout said photograph station and a certain area adjacent and in advance thereof along said path, a photoelectric cell adapted to collect light energy impinging upon the document to be next photographed, under conditions where said such next document is adjacent said photograph station and within said certain area, an electrical power source for energizing said light source, an electronic fast responsive network for varying the energization of said light source by said power source, said cell responding to variations in intensity of said collected light to cause said network to vary said energization inversely to said light intensity variations, and a second light source provided for projecting a focused beam of light upon said certain area for collection by said photoelectric cell, said light source being manually adjustable to provide a predetermined amount of constant light upon said certain area to bias photoelectric cell brightness measurements.

9. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a predetermined portion of said path extending throughout said photograph station and a certain area adjacent and in advance thereof along said path, a photoelectric cell adapted to collect light energy impinging upon the document to be next photographed, under conditions where said such next document is adjacent said photograph station and within said certain area, an electrical alternating power source for energizing said light source, and an electronic fast responsive network for varying the energization of said light source by said power source, said cell responding to variations in intensity of said collected light to cause said network to vary said energization inversely to said light intensity variations, said electronic network including a bilateral switching diode connected in series with said power source, and triggering means for said switching diode adapted to control the firing of said switching diode bilaterally, said triggering means including a bilateral avalanche trigger diode, and a resistor-capacitor timing network including said photoelectric cell, said timing network being adapted to control the bilateral current conduction of said bilateral avalanche triggering diode in accordance with the intensity of light collected by said photoelectric cell.

10. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a predetermined portion of said path extending throughout said photograph station and a certain area adjacent and in advance thereof along said path, a photoelectric cell adapted to collect light energy impinging upon the document to be next photographed, under conditions where said such next document is adjacent said photograph station and within said certain area, an electrical alternating power source for energizing said light source, and an electronic fast responsive network for varying the energization of said light source by said power source, said cell responding to variations in intensity of said collected light to cause said network to vary said energization inversely to said light intensity variations, said electronic fast responsive network being electrically connected in series with said light source and said power source, said electronic network including a bilateral switching diode, a pulsing transformer having primary and secondary windings, a bilateral avalanche triggering diode and a resistor-capacitor timing network adapted to control the bilateral conduction of said triggering diode, said switching diode being connected in series with said power source, said light source and said secondary winding of said pulsing transformer, said triggering diode being connected in series with said primary winding of said pulsing transformer, said photoelectric cell being of the photoconductive type and connected in shunting relationship to the capacitor of said resistor-capacitor network to vary the time constant thereof in accordance with the intensity of light collected by said photoelectric cell.

11. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a certain portion of said path, said certain portion extending throughout said photograph station and a certain area in advance and adjacent thereto along said path, a photoelectric cell adapted to measure sequentially the brightness of each document relative to a certain brightness as said documents arrive sequentially within said certain adjacent area, said cell producing an electrical signal indicating said measured brightness, an electrical power source for energizing said light source, an electronic power modulating network for varying the energization of said light source by said power source in accordance with said brightness measurement indications, said power modulating network effecting such modulation of said light source energization in accordance with the measured brightness of each individual document as such measured document arrives at said photograph station, document detecting means actuatable from a first to a second condition by movement of a document into said certain area, said detecting means being maintained in said second condition by the presence of a document in said certain area and, upon the cessation of such presence, being returned to said first condition, and light reflecting means responsive to actuation of said detecting means to said second condition to reflect a predetermined amount of light from said light source onto said photoelectric cell for measurement thereby.

12. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a certain portion of said path, said certain portion extending throughout said photograph station and a certain area in advance and adjacent thereto along said path, a photoelectric cell adapted to measure sequentially the brightness of each document relative to a certain brightness as said documents arrive sequentially within said certain area, said cell producing an electrical signal indicating said measured brightness, an electrical power source for energizing said light source, an electronic power modulating network for varying the energization of said light source by said power source in accordance with said brightness measurement indications, said power modulating network effecting such modulation of said light source energization in accordance with the measured brightness of each individual document as such measured document arrives at said photograph station, document detecting means actuatable from a first to a second condition by movement of a document into said certain area, said detecting means being maintained in said second condition by the presence of a document in said certain area and upon the cessation of such presence being returned to said first condition, and a member having a light reflecting surface, said member being pivotally mounted and normally spring biased into a certain nonreflecting position, said member being actuated to reflecting position against its spring bias by actuation of said detecting means to said first condition to reflect a predetermined amount of light from said light source onto said photoelectric cell for measurement thereby.

13. In a continuous flow type microfilm camera in which a document transport sequentially feeds a plurality of documents at a certain speed of document travel along a predetermined path extending through a photograph station for photographic reproduction thereat onto an associated reel of film; and a light source is adapted, when energized, to provide illumination of said documents for photographing, said light source projecting light upon a certain portion of said path, said certain portion extending throughout said photograph station and a certain area in advance and adjacent thereto along said path, a film exposure control comprising, a photoelectric cell adapted to measure sequentially the brightness of each document relative to a certain brightness as said documents arrive sequentially within said certain illuminated adjacent area, an electrical power source energizing said light source, an electronic power modulating network operatively responsive to said sequential brightness measurements to vary the energization of said light source by said power source to illuminate each document of an amount corresponding to the measured brightness of such document as such document arrives at said photograph station, means responsive to the absence of a document at said certain adjacent area, and brightness simulating means actuatable by said sensing means for simulating a predetermined brightness causing said cell to measure a brightness magnitude of a predetermined greater amount than said certain brightness.

14. In a continuous flow type microfilm camera in which a document transport sequentially feeds a plurality of documents at a certain speed of document travel along a predetermined path extending through a photograph station for photographic reproduction thereat onto an associated reel of film; and a light source is adapted, when energized, to provide illumination of said documents for photographing, said light source projecting light upon a certain portion of said path, said certain portion extending throughout said photograph station and a certain area in advance and adjacent thereto along said path; a film exposure control comprising, a photoelectric cell adapted to measure sequentially the brightness of each document relative to a certain brightness as said documents arrive sequentially within said certain illuminated adjacent area, an electrical power source energizing said light source, an electronic power modulating network operatively responsive to said sequential brightness measurements to vary the energization of said light source by said power source to illuminate each document an amount corresponding to the measured brightness of such document as such document arrives at said photograph station, brightness simulating means actuatable from an operative to an inoperative condition, said simulating means when in said operative condition causing said cell to measure a brightness magnitude of a predetermined greater amount than said certain brightness, and document detecting means for detecting the presence of a document at said certain adjacent area and upon such detection, actuating said simulating means to said inoperative condition.

15. An exposure control for a continuous flow type microfilm camera in which camera each document to be next photographed is moved at a certain speed along a predetermined path through a photograph station for photographic reproduction thereat onto film and is illuminated at such station for photographing by a light source, said control being characterized in that said light source projects light upon a certain portion of said path extending through said photograph station and a certain area in advance and adjacent thereto along said path, and in which control are provided a photoelectric cell measuring the brightness of said next document relative to a certain brightness as said next document arrives within said certain adjacent area, and electrical energizing means for said light source, said energizing means being responsive to said cell measurement to energize, as such next document arrives at said photograph station for photographing, said light source for an illumination intensity predetermined in accordance with the measured brightness of such next document, said photoelectric cell being of the photoconductive type and variably excited by light reflected from the surface of said document in said adjacent area, said electrical energizing means including bidirectional current conducting means comprising bilateral switching means and associated triggering means, said switching means adapted to be triggered by said triggering means from a blocking to a conductive state for either polarity of applied voltage for energizing said light source, said triggering means including a resistor-capacitor timing circuit for controlling the firing of said triggering means, the impedance values of said timing circuit elements being selected for predetermined variation of said timing constant in accordance with said variable excitation of said photoelectric cell.

16. A continuous flow photographic reproducing device comprising, a document transport for feeding documents in certain timed sequence along a predetermined path to a photograph station for photographic reproduction thereat, camera means for sequentially photographing said documents upon arrival at said photograph station, a light source adapted when energized to provide illumination of said documents for photographing, said light source projecting light upon a predetermined portion of said path extending throughout said photograph station and a certain area adjacent and in advance thereof along said path, a photoelectric cell adapted to collect light energy impinging upon the document to be next photographed, under conditions where said such next document is adjacent said photograph station and within said certain area, an electrical alternating power source for energizing said light source, and an electronic fast responsive network for varying the energization of said light source by said power source, said cell responding to variations in intensity of said collected light to cause said network to vary said energization inversely to said light intensity variations, said electronic network including bidirectional current conducting means comprising bilateral switching means and associated triggering means, said switching means adapted to be triggered by said triggering means from a blocking to a conductive state for either polarity of said alternating power, said triggering means including a resistor-capacitor timing circuit for controlling the firing of said triggering means, the impedance values of said timing elements being selected for predetermined variation of said timing constant in accordance with said excitation of said photoelectric cell.

References Cited by the Examiner

UNITED STATES PATENTS 2,464,162   3/1949   Tuttle et al. _____ 88—24

FOREIGN PATENTS 696,432   9/1953   Great Britain.

NORTON ANSHER, *Primary Examiner.*

R. A. WINTERCORN, *Assistant Examiner.*

UNITED STATES PATENT OFFICE
CERTIFICATE OF CORRECTION

Patent No. 3,279,312

October 18, 1966

Elwood C. Rogers, Jr.

It is hereby certified that error appears in the above numbered patent requiring correction and that the said Letters Patent should read as corrected below.

Column 10, lines 60 and 61, for "are provided a photoelectric cell measuring the jects" read -- being characterized in that said light source projects --.

Signed and sealed this 5th day of September 1967.

(SEAL)
Attest:

ERNEST W. SWIDER
Attesting Officer

EDWARD J. BRENNER
Commissioner of Patents